(12) United States Patent
Araki et al.

(10) Patent No.: US 6,546,151 B1
(45) Date of Patent: Apr. 8, 2003

(54) INFORMATION PROCESSING APPARATUS AND INFORMATION EQUIPMENT USING THE INFORMATION PROCESSING APPARATUS

(75) Inventors: Shoichi Araki, Osaka (JP); Kouji Miura, Matsubara (JP); Satoshi Matsuura, Osaka (JP); Takeshi Imanaka, Nara (JP); Hiroshi Kutsumi, Moriguchi (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 0 days.

(21) Appl. No.: 09/234,383

(22) Filed: Jan. 20, 1999

(30) Foreign Application Priority Data

Jan. 22, 1998 (JP) ............................................. 10-010222

(51) Int. Cl.[7] ............................ G06K 9/20; G06K 9/46; G06K 9/62; G06K 9/64; H04N 1/46

(52) U.S. Cl. ..................... 382/282; 382/209; 382/190; 382/217; 382/219; 382/317; 358/453; 358/538

(58) Field of Search ................................ 382/162, 163, 382/164, 165, 166, 167, 168, 169, 170, 171, 172, 254, 255, 219, 317, 221, 222, 294, 282, 173–180, 190, 217, 209; 340/815.54, 815.57, 815.68; 358/1.16, 1.17, 1.18

(56) References Cited

U.S. PATENT DOCUMENTS

| 4,538,182 A | * | 8/1985 | Saito et al. | 358/280 |
| 5,055,941 A | * | 10/1991 | Suzuki et al. | 358/450 |
| 5,138,465 A | * | 8/1992 | Ng et al. | 358/153 |
| 5,159,187 A | * | 10/1992 | Okisu et al. | 250/208 |
| 5,181,255 A | * | 1/1993 | Bloomberg | 382/9 |
| 5,381,248 A | * | 1/1995 | Ikeda et al. | 358/538 |
| 5,521,843 A | * | 5/1996 | Hashima et al. | 364/516 |
| 5,631,747 A | * | 5/1997 | Farrell et al. | 358/448 |
| 5,659,639 A | * | 8/1997 | Mahoney et al. | 382/309 |

(List continued on next page.)

FOREIGN PATENT DOCUMENTS

| JP | 57-164655 | 10/1982 |
| JP | 60-201773 | 10/1985 |
| JP | 04288541 A | 10/1992 |
| JP | 05137005 A | 6/1993 |
| JP | 5-219316 | 8/1993 |
| JP | 06152962 | 5/1994 |
| JP | 06334862 A | 12/1994 |
| JP | 06337928 | 12/1994 |
| JP | 07168938 | 7/1995 |
| JP | 07298075 | 11/1995 |
| JP | 08032794 | 2/1996 |
| JP | 08125855 A | 5/1996 |
| JP | 08167029 | 6/1996 |
| JP | 08329110 | 12/1996 |
| JP | 08331394 | 12/1996 |
| JP | 09016766 | 1/1997 |
| JP | 09107462 | 4/1997 |

*Primary Examiner*—Phuoc Tran
*Assistant Examiner*—Amir Alavi
(74) *Attorney, Agent, or Firm*—Burr & Brown

(57) ABSTRACT

An information processing apparatus comprises an indication means placed on a manuscript; a reading unit for reading information on the manuscript; an indication means detection unit for detecting the indication means placed on the manuscript, thereby detecting a region indicated by the indication means on the manuscript; and an information processing unit performing a predetermined process to the information obtained from the region indicated by the detected indication means, amongst the information on the manuscript read by the reading unit. Therefore, by only placing the indication means on a target portion to be processed on the manuscript, the portion is detected by the indicated means detection unit to be subjected to a process such as scale-up by the information processing unit.

11 Claims, 15 Drawing Sheets

U.S. PATENT DOCUMENTS

| | | | |
|---|---|---|---|
| 5,692,073 A | * 11/1997 | Cass | 382/219 |
| 5,696,843 A | * 12/1997 | Miyaza | 382/176 |
| 5,732,139 A | * 3/1998 | Lo et al. | 380/28 |
| 5,805,200 A | * 9/1998 | Counselman, III | 342/357 |
| 5,831,747 A | * 11/1998 | Salgado | 358/453 |
| 6,014,444 A | * 1/2000 | Nakamura et al. | 380/9 |
| 6,115,505 A | * 9/2000 | Hashima et al. | 382/286 |

* cited by examiner

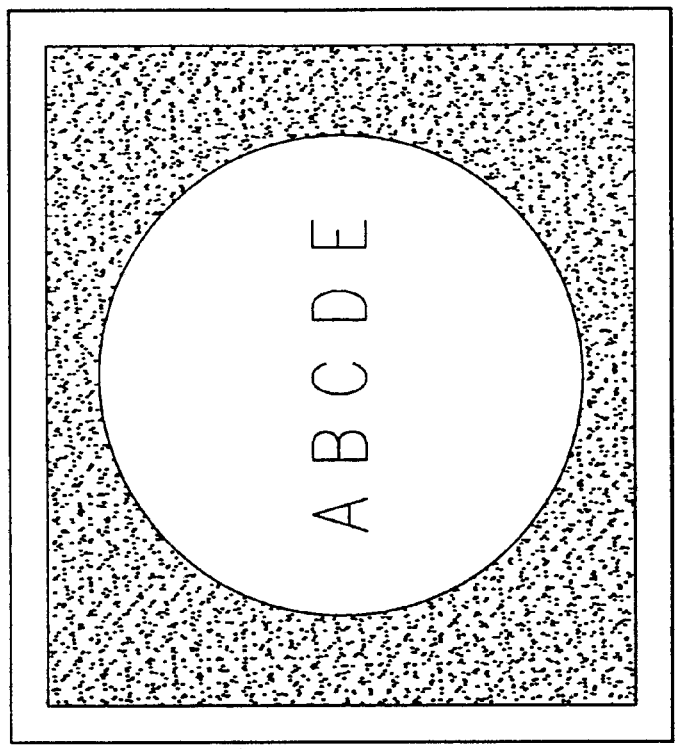
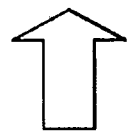
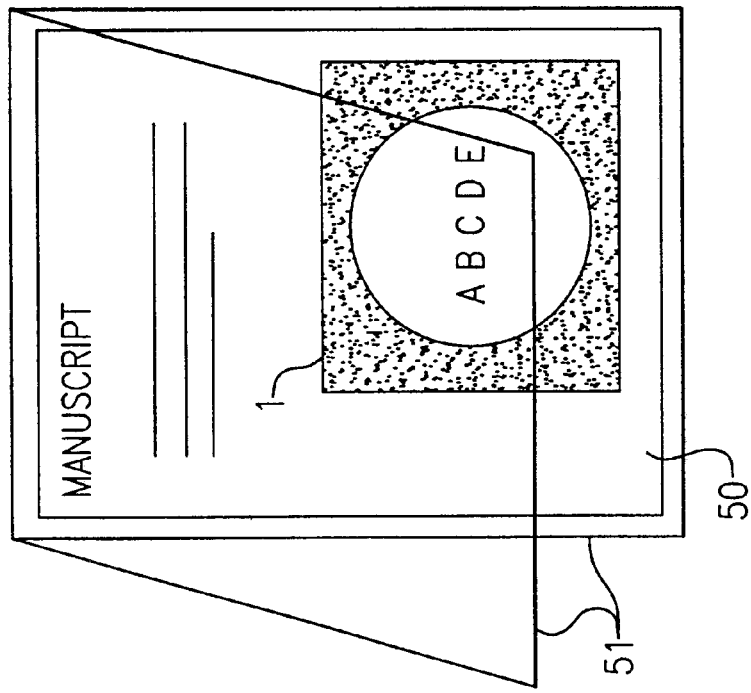
FIG.3(b)
FIG.3(a)

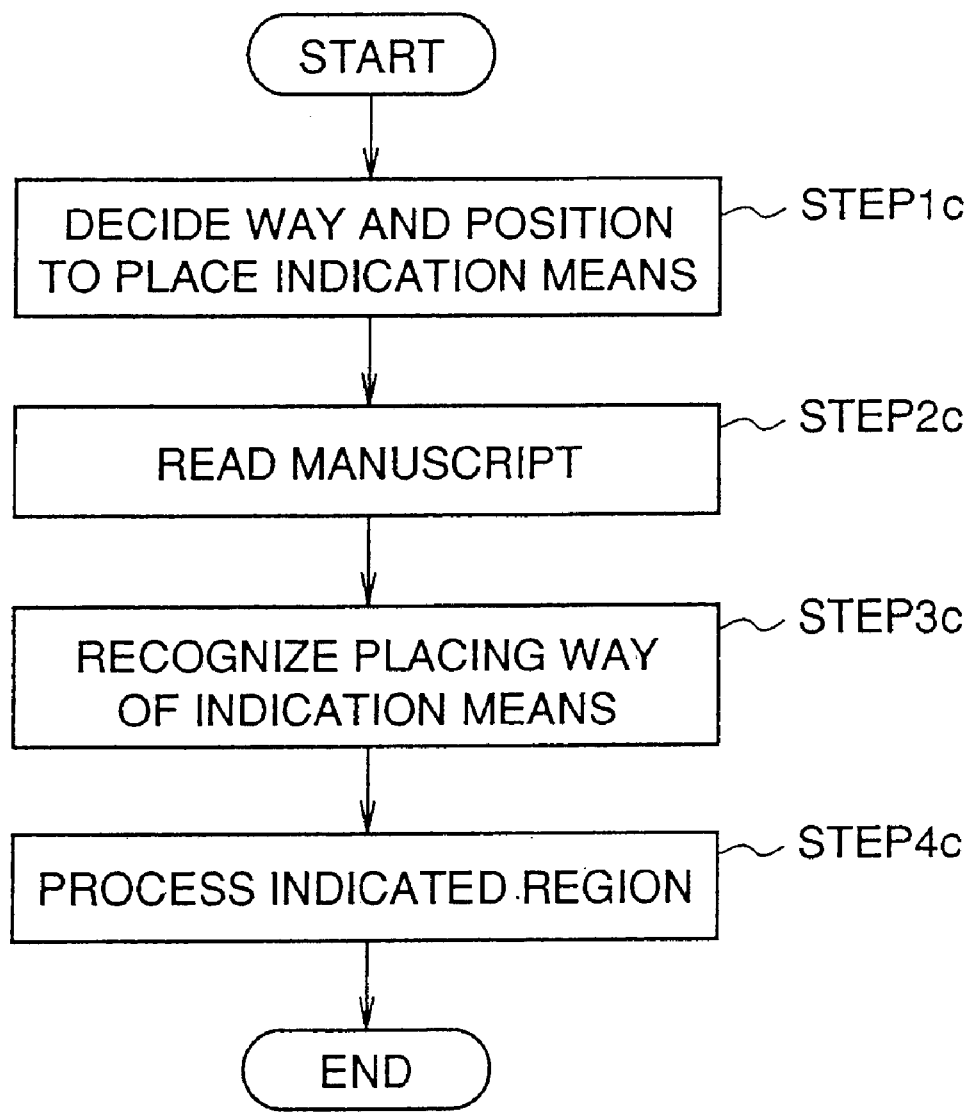

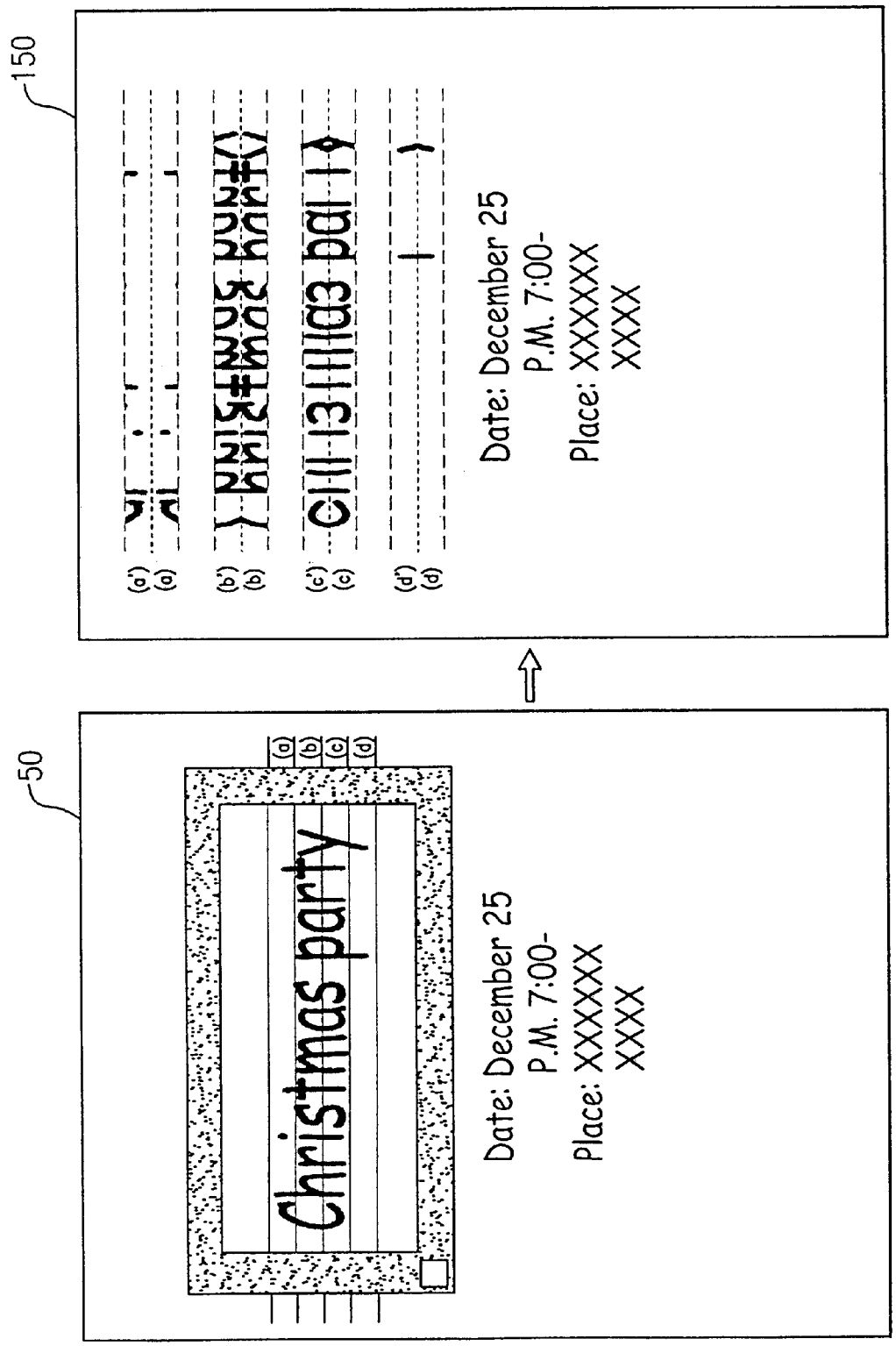

INFORMATION PROCESSING APPARATUS AND INFORMATION EQUIPMENT USING THE INFORMATION PROCESSING APPARATUS

FIELD OF THE INVENTION

The present invention relates to information processing apparatus and information equipment such as a copying machine and a facsimile machine, using the information processing apparatus. More particularly, the invention relates to information processing apparatus having a function of processing a specific region of a manuscript, and information equipment using the information processing apparatus.

BACKGROUND OF THE INVENTION

Japanese Published Patent Application No. Sho.60-201773 discloses "a facsimile machine" in which a band-shaped mark entered in an edge of a manuscript is detected, and a region defined by the mark is enlarged to be transmitted. Meanwhile, Japanese Published Patent Application No. Sho.57-164655 discloses "a manuscript carrier sheet and a facsimile machine using the carrier sheet" in which a mark for indicating a scale factor is entered in a transparent manuscript carrier sheet. Further, Japanese Published Patent Application No. Hei.5-219316 discloses "a manuscript reading method and a facsimile machine using this method" in which a mark entered in a manuscript carrier sheet is detected to define a region indicated by the mark, and only the defined region is transmitted.

In the above-described facsimile machines in which a mark for indicating a scale factor or a specific region is entered directly on a manuscript or a manuscript carrier sheet, when different portions of the same manuscript are transmitted to different addresses, it is necessary to delete a mark which has been entered before, and this takes much labor.

SUMMARY OF THE INVENTION

The present invention is made to solve the above-described problem and has for its object to provide an information processing apparatus in which an indication means for indicating a specific region is placed on a manuscript, and the region where the indication means is placed and the type of the indication means are recognized to subject the region to a process such as scale-up according to the type of the indication means.

The present invention also relates to information equipment using the information processing apparatus.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, an information processing apparatus comprises: an indication means placed on a manuscript; a reading unit for reading information on the manuscript; an indication means detection unit for detecting the indication means placed on the manuscript, thereby detecting a region indicated by the indication means on the manuscript; and an information processing unit performing a predetermined process to the information obtained from the region indicated by the detected indication means, amongst the information on the manuscript read by the reading unit.

According to a second aspect of the present invention, in the above-described information processing apparatus, the indication means detection unit detects a process indicated by the indication means; and the information processing unit performs the process indicated by the indication means to the information obtained from the region indicated by the indication means.

According to a third aspect of the present invention, in the above-described information processing apparatus, the indication means detection unit recognizes the way of placing the indication means; and the information processing unit performs a process which is decided according to the placing way recognized by the indication means detection unit, to the information obtained from the region indicated by the indication means.

According to a fourth aspect of the present invention, in the above-described information processing apparatus, the predetermined process is a process of encrypting the information in the region indicated by the indication means.

According to a fifth aspect of the present invention, in the above-described information processing apparatus, the encryption process comprises the steps of dividing the information in the region indicated by the indication means into a plurality of sub-regions in a predetermined direction; arranging these sub-regions at regular intervals along the predetermined direction; and adding information, which is symmetrical with the information of each sub-region in the predetermined direction, to the information of each sub-region.

According to a sixth aspect of the present invention, an information processing apparatus comprises: a reading unit for reading information on a manuscript; a manuscript correction parameter decision unit for detecting the distribution of concentration of the manuscript from the information read by the reading unit, and deciding a correction parameter for a blurred potion of the manuscript based on the result of the decision; and a blur correction unit for correcting the blurred portion of the manuscript based on the correction parameter.

According to a seventh aspect of the present invention, an information processing apparatus comprises: an indication means placed on a manuscript; a reading unit for reading information on the manuscript; an indication means detection unit for detecting the indication means placed on the manuscript, thereby detecting a process indicated by the indication means; and an information processing unit performing the process indicated by the indication means, to the information read by the reading unit.

According to an eighth aspect of the present invention, an information equipment comprises: an indication means placed on a manuscript; a reading unit for reading information on the manuscript; an indication means detection unit for detecting the indication means placed on the manuscript, thereby detecting a region indicated by the indication means on the manuscript; and an information processing unit performing a predetermined process to the information obtained from the region indicated by the detected indication means, amongst the information on the manuscript read by the reading unit.

According to a ninth aspect of the present invention, an information equipment comprises: a reading unit for reading information on a manuscript; a manuscript correction parameter decision unit for detecting the distribution of concentration of the manuscript from the information read by the reading unit, and deciding a correction parameter for a blurred potion of the manuscript based on the result of the detection; and a blur correction unit for correcting the blurred portion of the manuscript based on the correction parameter.

According to a tenth aspect of the present invention, an information equipment comprises: an indication means placed on a manuscript; a reading unit for reading information on the manuscript; an indication means detection unit for detecting the indication means placed on the manuscript, thereby detecting a process indicated by the indication means; and an information processing unit performing the process indicated by the indication means, to the information read by the reading unit.

BRIEF DESCRIPTION OF THE DRAWINGS

FIGS. 3(a) and 3(b) are diagrams illustrating an example of an information processing method.

FIG. 9 is a flowchart showing the operation procedure of the third embodiment.

FIGS. 14(a) and 14(b) are diagrams illustrating an example of encryption (mountain-folding and valley-folding).

DETAILED DESCRIPTION OF THE PREFERRED EMBODIMENTS

Hereinafter, embodiments of the present invention will be described with reference to the drawings.

Embodiment 1

Figure 1:
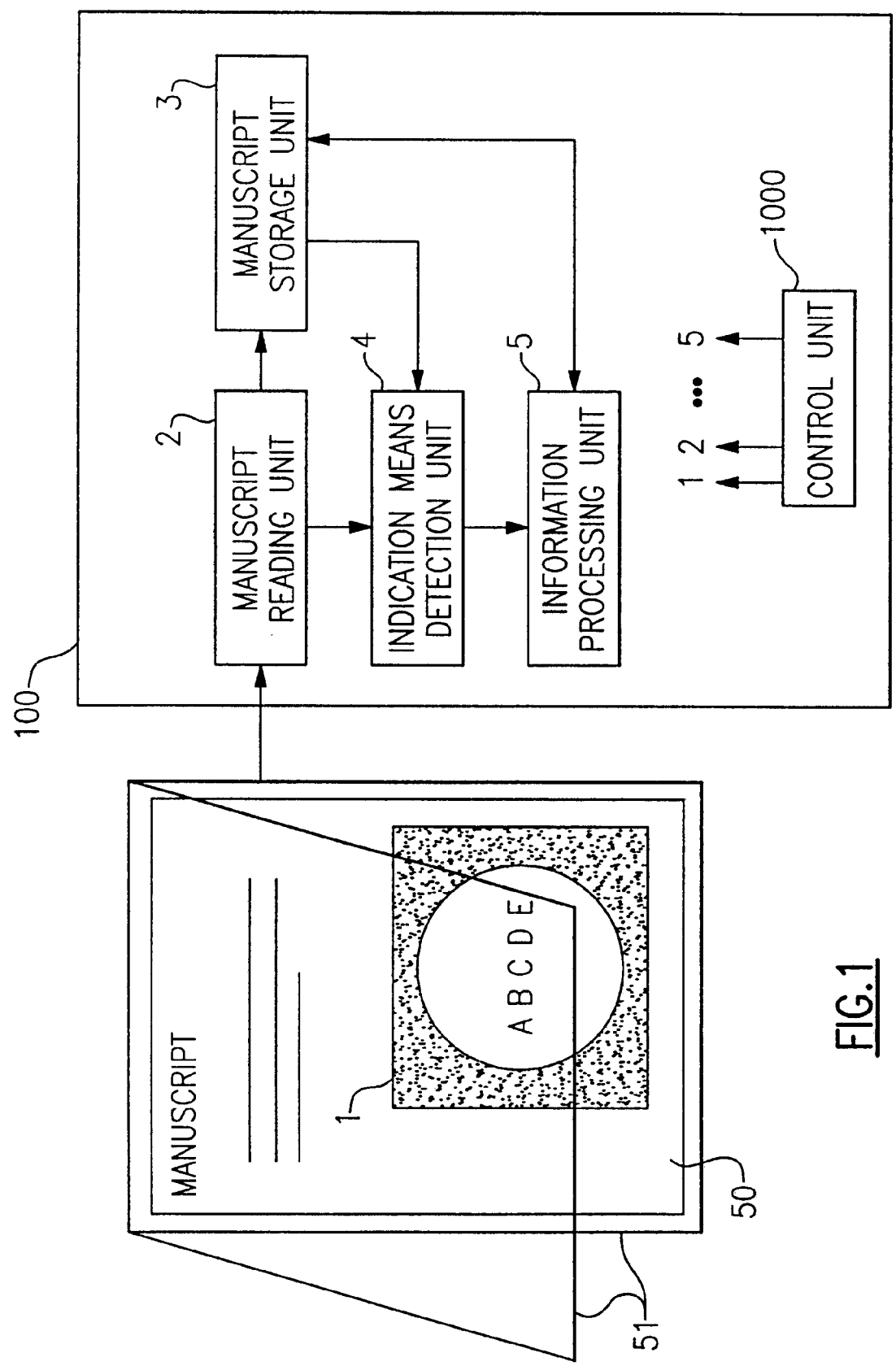
FIG. 1 is a block diagram illustrating a first embodiment of the present invention.

FIG. 1 is a block diagram illustrating a first embodiment of the present invention. In this first embodiment, an information processing apparatus according to the present invention is mounted on a facsimile machine. In FIG. 1, reference numeral 1 designates an indication means which is placed on a manuscript 50 and put between manuscript carrier sheets 51 together with the manuscript 50. This indication means 1 is made of a sheet material which is decided as black when being read, and shaped like a frame having an opening in the center. Usually, the indication means 1 is called a template. The manuscript carrier sheets 51 comprises two pieces of sheet materials which can hold the manuscript 50 put between them. The manuscript carrier sheet 51 contacting the surface of the manuscript 50 comprises a material having transparency, such as a transparent film, so that image information on the surface of the manuscript 50 can be read. Reference numeral 100 designates a facsimile machine. Reference numeral 2 designates a manuscript reading unit for reading the manuscript 50 put between the manuscript carrier sheets 51, and this unit corresponds to a scanner mounted on an ordinary facsimile machine. Reference numeral 3 designates a manuscript storage unit which stores at least a part of the manuscript 50 read by the manuscript reading unit 2, and this unit is usually implemented by a RAM (random-access memory). Reference numeral 4 designates an indication means detection unit which detects a region indicated by the indication means 1, from image data stored in the manuscript storage unit 2. Reference numeral 5 designates an information processing unit which performs a predetermined process such as scale-up to the information on the manuscript, which information is indicated by the indicated means 1 and detected by the indication means detection unit 4. Reference numeral 1000 designates a control unit comprising a memory such as a ROM or a RAM, and a CPU. This control unit 1000 is connected to the above-described units 1~5 to control their operations and data exchange between them. Although it is not shown in FIG. 1, the data of the manuscript 50 processed by the information processing unit 5 are printed under control of the control unit 1000, or transmitted to another facsimile through a telephone line.

Figure 2:
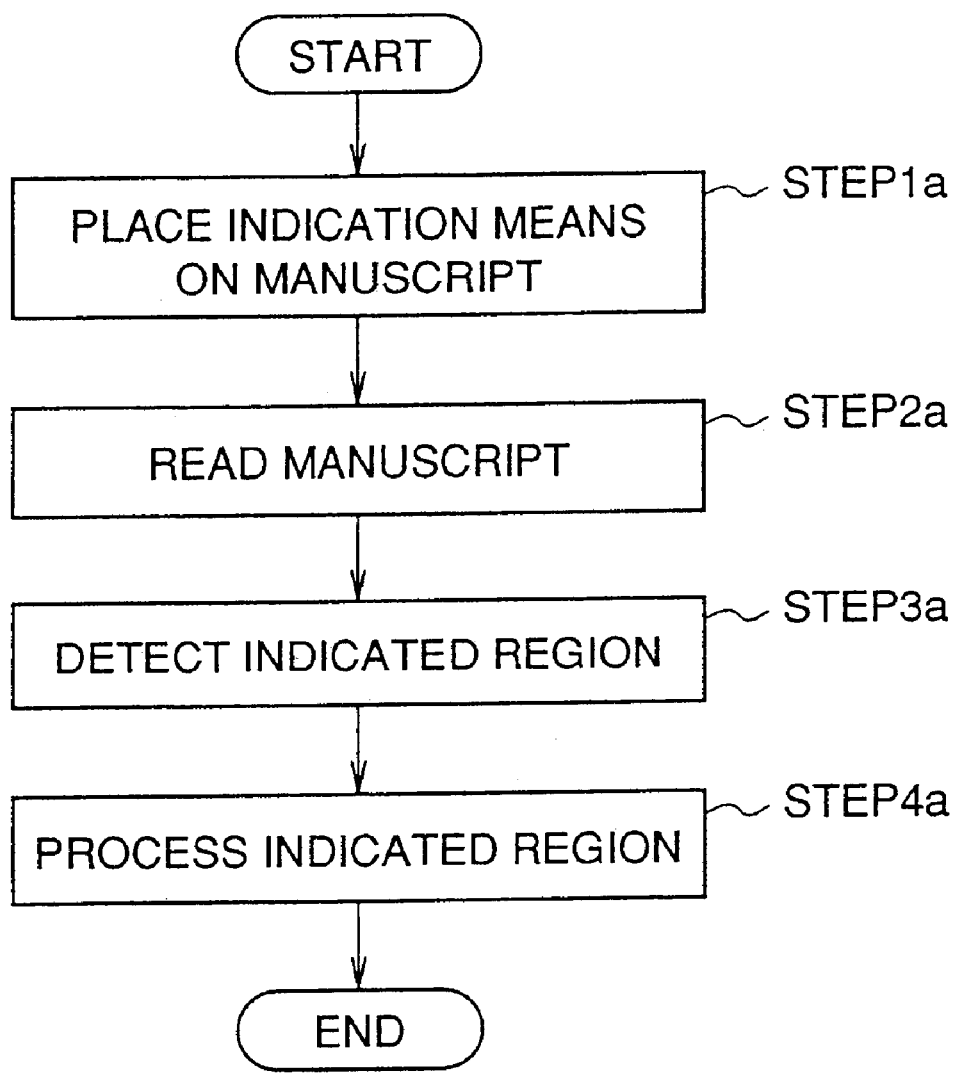
FIG. 2 is a flowchart showing the operation procedure of the first embodiment.

Hereinafter, the operation of the information processing apparatus according to the first embodiment will be described with reference to a flowchart of FIG. 2.

For simplification, a description is given of the case where characters on a part of the manuscript 50 to be transmitted by the facsimile machine are small and hard to read and, therefore, this part is indicated by the indication means 1 to be enlarged. The procedure of the operation is as follows.

[STEP1a] Placement of Indication Means

As shown in FIG. 3(a), the indication means 1 is placed on the manuscript 50 at a portion to be processed, and the manuscript 50 and the indication means 1 are put between the carrier sheets 51.

[STEP2a] Reading of Manuscript

The manuscript 50 put between the carrier sheets 51 is read by the manuscript reading unit 2 to be stored in the manuscript storage unit 3. It is assumed that image data of the manuscript 50 is represented by I(x,y). For example, the image data in a white (blank) portion of the manuscript 50 is stored as I(x,y)=0, while the image data in a black portion where characters or the like are written is stored as I(x,y)=1. In an ordinary facsimile machine, $0 \leq x \leq 1728$ and $0 \leq y \leq 1100$.

[STEP3a] Detection of Indicated Region

In this step, a region of the manuscript 50, where the indication means 1 is placed, is detected by the indication means detection means 4. For example, when the indication means 1 is made of a black sheet and shaped like a frame thicker than characters and the like on the manuscript 50 as shown in FIG. 3(a), this indication means 1 can be detected by an ordinary image processing method, as follows. Initially, the image on the manuscript 50 is divided into a plurality of sub-blocks each including a predetermined number of pixels, and sub-blocks including black pixels (I(x,y)=

1) more than a predetermined number are selected as candidates for the indicated region. Next, with respect to the selected sub-blocks, sub-blocks which are connected to each other and contact the selected sub-blocks in the vertical, horizontal, and diagonal directions are obtained. Finally, amongst the connected sub-blocks so obtained, sub-blocks corresponding to the size of the indication means 1 are selected.

[STEP4a] Processing of Indicated Region

In this step, the information processing unit 5 performs a predetermined process which has previously been set, to the image data in the region indicated by the frame-shaped indication means 1 detected in [STEP3a], i.e., the region enclosed by the frame-shaped indication means 1. For example, when the predetermined process is "scale-up" to enlarge the region enclosed by the indication means 1 by two times in both of the vertical and horizontal directions (i.e., to enlarge the area of the region by four times) as shown in FIG. 3(b), the image data enclosed by the indication means 1 is processed as follows, as in the ordinary image processing, assuming that the image after scale-up is I'(X, Y).

$$I'(2x2y)=I'(2x+1,2y)=I'(2x2y+1)=I'(2x+1,2y+1)=I(x,y)$$

where (x,y) represents the positions of pixels inside the region enclosed by the indication means 1.

As described above, according to the procedure along [STEP1a]~[STEP4a], when the manuscript 50, on which the indication means 1 is placed at a portion to be processed, is put between the carrier sheets 51, the portion indicated by the indication means 1 is detected to be subjected to a predetermined process such as scale-up. Further, different portions of the same manuscript can be processed repeatedly by only changing the position of the indication means 1 on the manuscript.

While in this first embodiment the indication means 1 is put between the carrier sheets 51, the carrier sheets 51 are not always necessary. That is, the indication means 1 may be placed on the manuscript 50 by any means as long as it is fixed on the manuscript 50 when reading the manuscript 50. For example, an adhesive may be applied to the rear surface of the indication means 1, which adhesive enables repeated attachment and detachment of the indication means 1 to/from the manuscript 50. In this case, the indication means 1 is temporarily attached to the manuscript 50 when reading the manuscript 50.

Further, while in this first embodiment the indication means 1 comprises a sheet which is decided as black when the manuscript 50 is read, any sheet may be employed as long as it can be distinguished from the image information on the manuscript 50 after the manuscript 50 and the indication means 1 have been read. For example, when the manuscript reading unit 2 is capable of reading by using color or gray scale, an indication means comprising a sheet having a specific color may be used to detect the indication means by this color.

Moreover, while in this first embodiment a frame-shaped indication means 1 is employed, an indication means of any shape may be used as long as it can indicate a specific region. For example, when a stripe-shaped indication means is used, it is placed on the manuscript along the side of image information to be processed, thereby specifying the image information to be processed within a region located at the side of the indication means.

Furthermore, while in this first embodiment scale-up is described as an example of the predetermined process performed by the information processing unit 5, it is needless to say that the information processing unit 5 can perform scale down and modification having various decorative effects such as shaded characters. In this case, these processes are entered in the facsimile machine in advance so that the user can select them by push button control or jog shuttle control.

Moreover, the predetermined process may be so-called "trimming" in which only the information read from the region indicated by the indication means 1 is stored while deleting the information read from the region other than the indicated region, thereby obtaining only the information in the indicated region.

While in the above-described procedure the indication means 1 is detected by image processing from the data of the manuscript read by the manuscript reading unit, a special scanner for reading the indication means 1 may be used, besides the manuscript reading unit.

Embodiment 2

Hereinafter, an information processing apparatus according to a second embodiment of the present invention will be described. In the first embodiment of the invention, a region enclosed by the indication means on the manuscript is detected to be subjected to a predetermined process. In this case, the user must input the predetermined process in advance by operating a button or the like of the equipment. This second embodiment is aimed to enable the user to use a variety of processes in a relatively simple manner.

Figure 4:
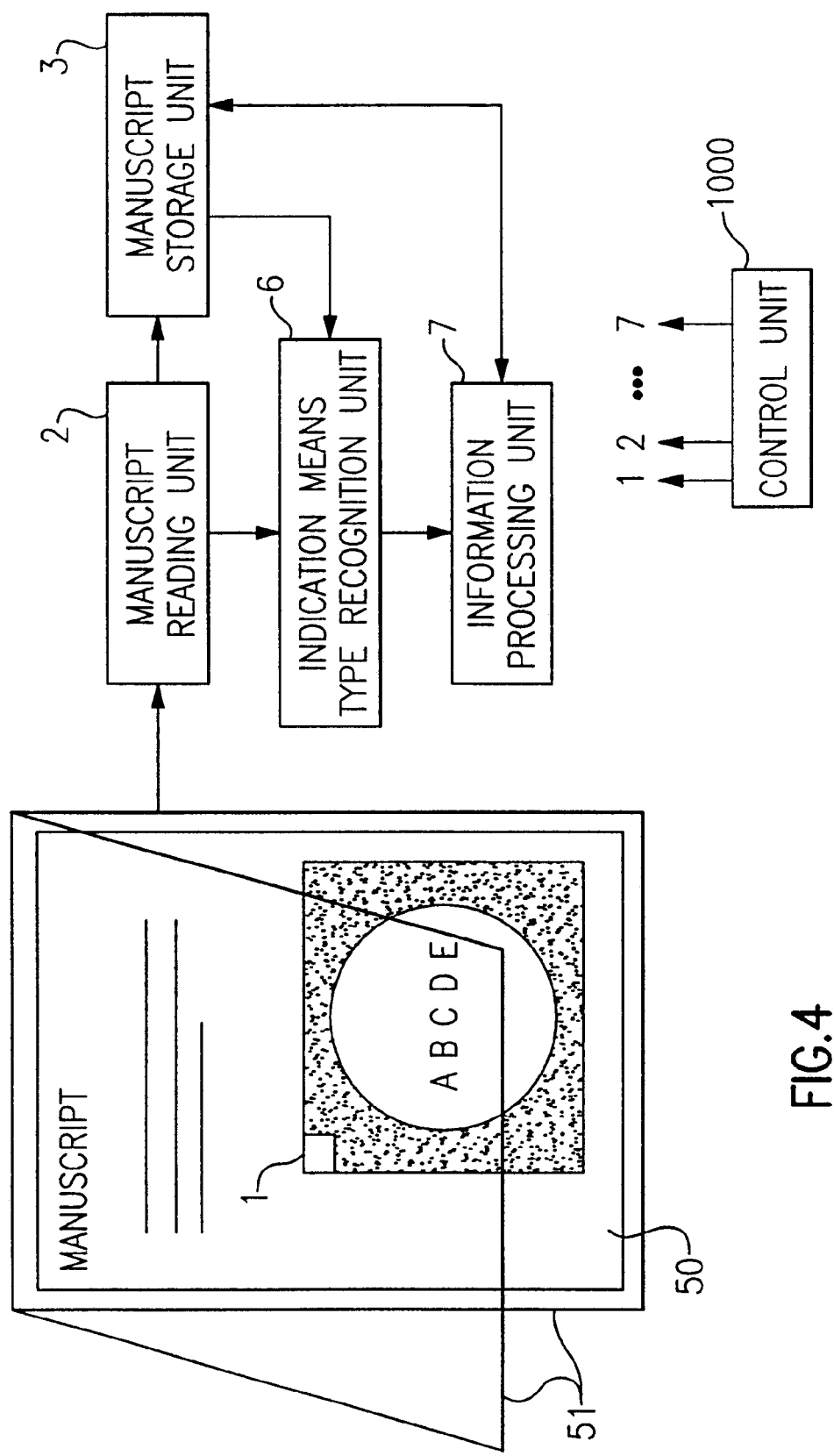
FIG. 4 is a block diagram illustrating a second embodiment of the present invention.

FIG. 4 is a block diagram illustrating an information processing apparatus according to the second embodiment of the invention. In FIG. 4, the same reference numerals as those shown in FIG. 1 designate the same or corresponding parts. This second embodiment is different from the first embodiment in that the indication means detection unit 4 of the first embodiment is replaced with an indication means recognition unit 6 which identifies each of different kinds of indication means, and the information processing unit 5 of the first embodiment is replaced with an information processing unit 7 which processes the manuscript according to the recognized indication means.

Figure 5:
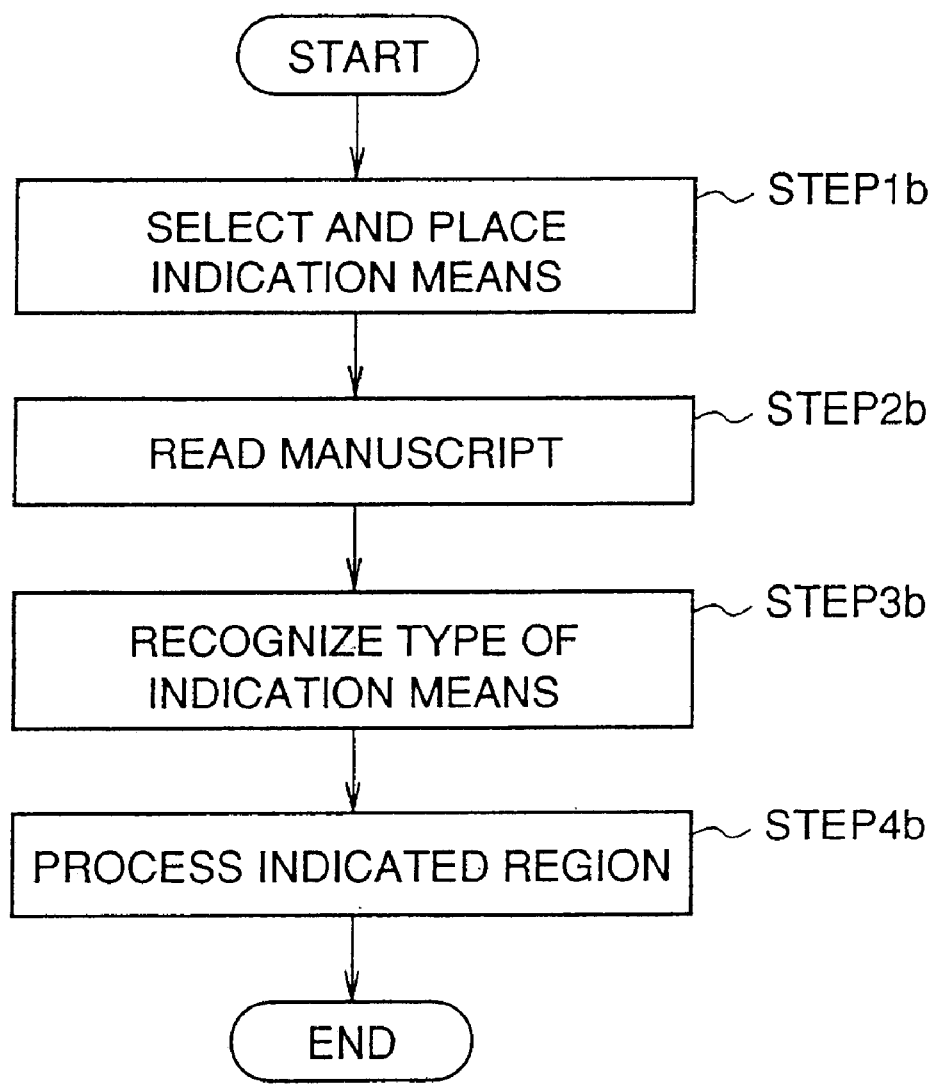
FIG. 5 is a flowchart showing the operation procedure of the first embodiment.

A description is now given of the operation of the information processing apparatus so constructed, with reference to a flowchart shown in FIG. 5. Since [STEP1b], [STEP3b], and [STEP4b] are different from those of the first embodiment shown in FIG. 2, only these steps will be described.

In this second embodiment, as shown in FIG. 6, three kinds of indication means 1a, 1b, and 1c are used. These indication means 1a~1c have white rectangle regions of a predetermined size, in different positions, as information for identification.

[STEP1b] Selection and Placement of Plural Indication Means

In this step, initially, the indication means 1a~1c corresponding to different kinds of processes as shown in FIG. 6 are selected. Then, these indication means 1a~1c are placed on the manuscript 50 at positions to be processed, and the manuscript 50 and the indication means 1a~1c are put between the carrier sheets.

[STEP3b] Recognition of Kind of Indication Means

Figure 7:
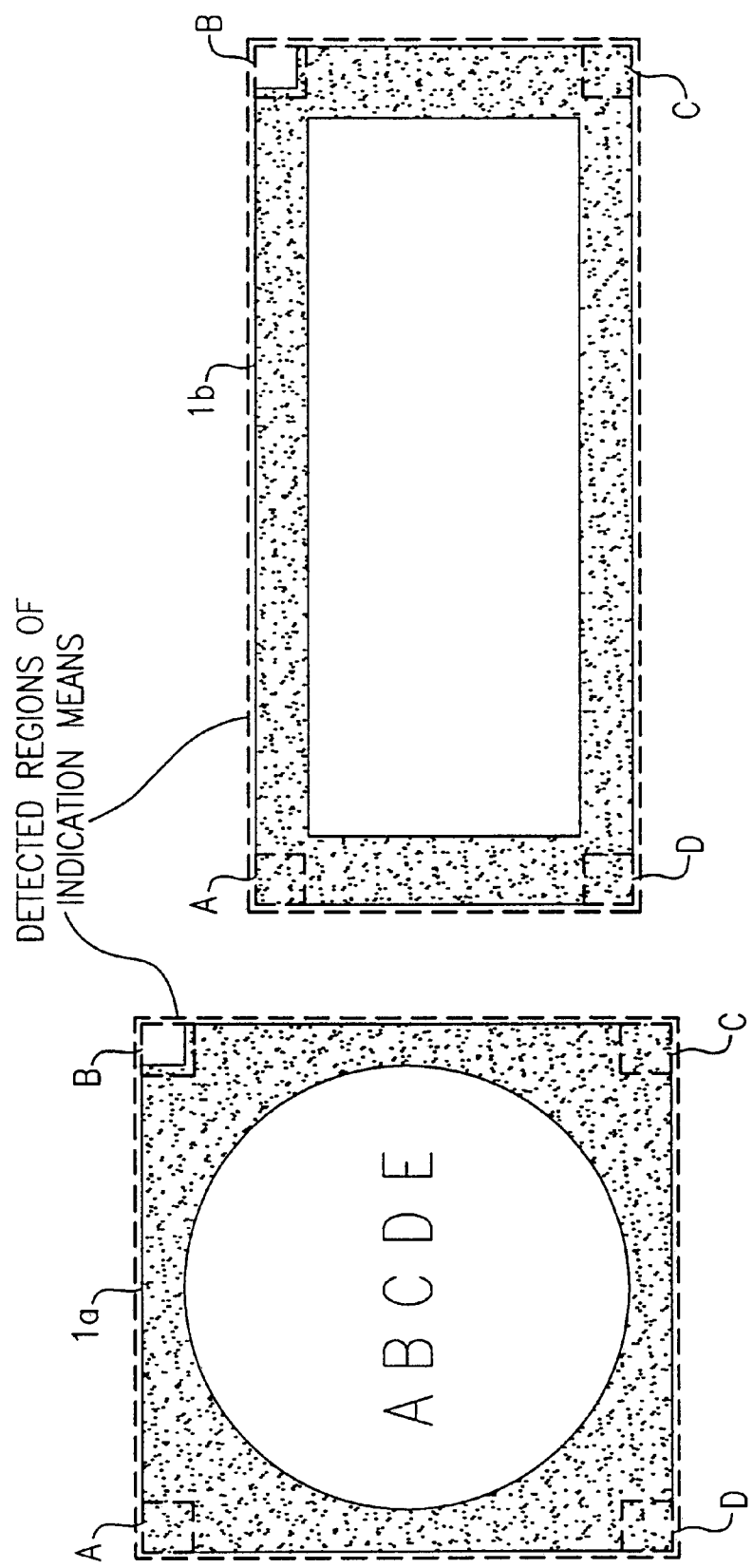
FIG. 7 is a diagram illustrating an example of a method for recognizing the type of the indication means.

Initially, the region of each indication means is obtained by the indication means recognition unit 6 in the same manner as described for [STEP3a] of the first embodiment. Next, as shown in FIG. 7, a region of a predetermined size is set at each of four corners of the rectangle region obtained, and the number of white pixels within the region is counted. Finally, a region including most white pixels is selected, and the type of the indication means is decided by the position (A, B, C or D) of the white rectangle region in the indication means.

[STEP4b] Information Processing According to Type of Indication Means

Figure 6C:
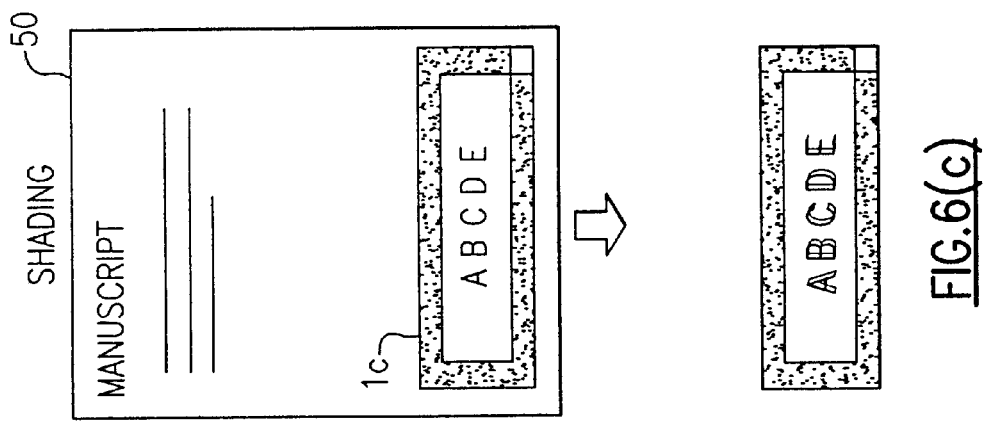
FIGS. 6(a)–(c) are diagrams illustrating a plurality of indication means, and corresponding processes.
Figure 6B:
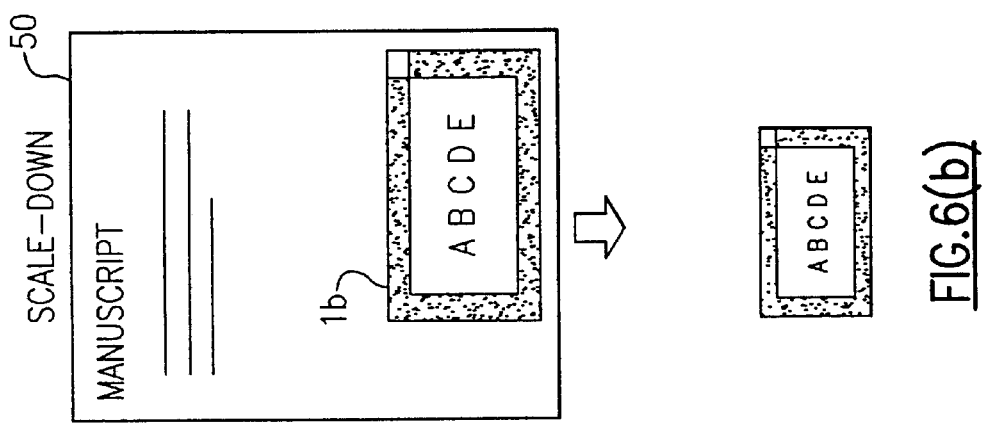
Figure 6A:
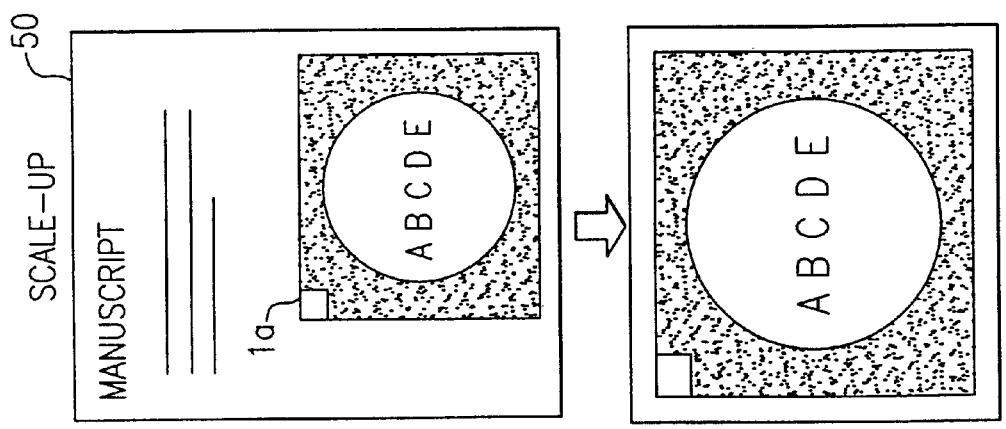

The manuscript is subjected to processes which have previously been determined according to the types A, B, C and D of the indication means recognized by the indication means recognition unit 6, for example, scale up, scale-down, shading etc. For example, when the write region is present at the upper-left corner of the indication means 1a as shown in FIG. 6(a) (i.e., the position indicated by A in FIG. 7), scale-up is carried out. When the white block is present at the upper-right corner of the indication means 1b as shown in FIG. 6(b) (i.e., the position indicated by B in FIG. 7), scale-down is carried out. When the white block is present at the lower-right corner of the indication means 1c as shown in FIG. 6(c) (i.e., the position indicated by C in FIG. 7), shading is carried out.

As described above, according to the second embodiment of the invention, the types of the indication means 1a~1c are recognized from their features, and predetermined processes are carried out according to the types recognized. Therefore, the user can process the manuscript as desired without necessity of operating a button or the like on the equipment to select the function.

In this second embodiment, to simplify the recognition, a portion of the black indication means is whitened, and the position of the white portion is detected to identify the indication means. However, other identification information such as bar codes may be applied, or the shape of the indication means itself may be recognized.

Furthermore, when the manuscript reading unit is capable of reading by color or gray scale, indication means comprising sheets having different colors corresponding to desired processes may be employed. In this case, the color of each indication means is detected by the indication means detection unit, and the information read from the manuscript is subjected to the process corresponding to the detected color.

Embodiment 3

Hereinafter, a description is given of an information processing apparatus according to a third embodiment of the present invention. In the second embodiment described above, processes to be applied to the manuscript are automatically switched by identifying a plurality of indication means corresponding to the processing methods. In this third embodiment, a plurality of processes can be selected by using a single indication means.

Figure 8:
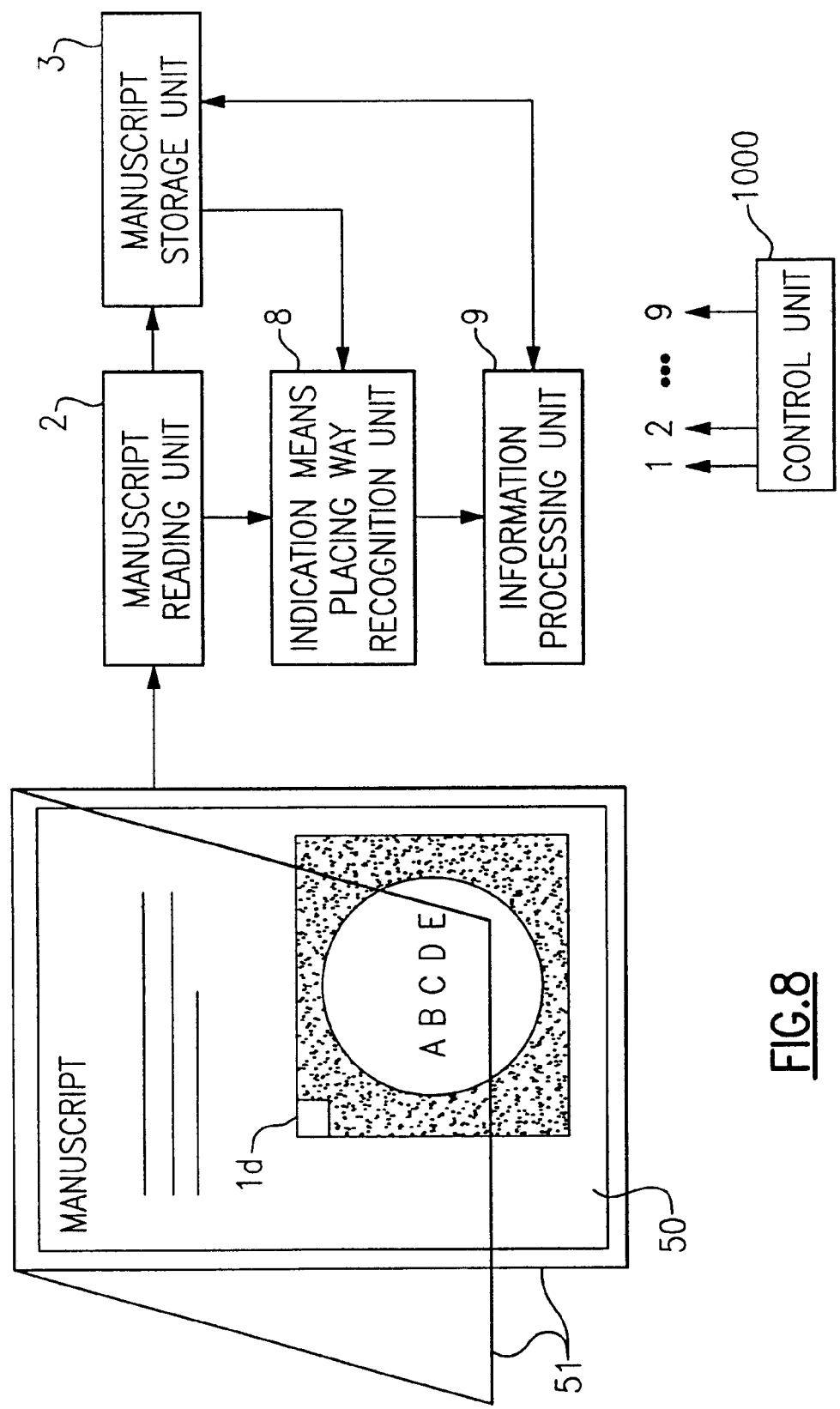
FIG. 8 is a block diagram illustrating a third embodiment of the present invention.

FIG. 8 is a block diagram illustrating the third embodiment of the invention, wherein the same reference numerals as those shown in FIG. 1 designate the same or corresponding parts. The third embodiment is different from the first embodiment in that the indication means detection unit 4 of the first embodiment is replaced with an indication means placing way recognition unit 8 which recognizes the placing way of the indication means, and the information processing unit 5 of the first embodiment is replaced with an information processing unit 9 which processes the manuscript according to the placing way recognized by the recognition unit 8.

Hereinafter, the operation of the information processing apparatus so constructed will be described with reference to a flowchart of FIG. 9. Since [STEP3c] and [STEP4c] are different from those of the flowchart of FIG. 2 showing the operation of the first embodiment, only these steps will be described. In this third embodiment, as shown in FIG. 10, a corner of an indication means 1d, which is vertically and horizontally symmetrical, is whitened by a predetermined square, and the placing way of the indication means 1d is recognized by the position of the white portion in the indication means 1d detected, thereby automatically switching the process to be applied to the manuscript.

[STEP1c] Placement of Indication Means

Figure 10C:
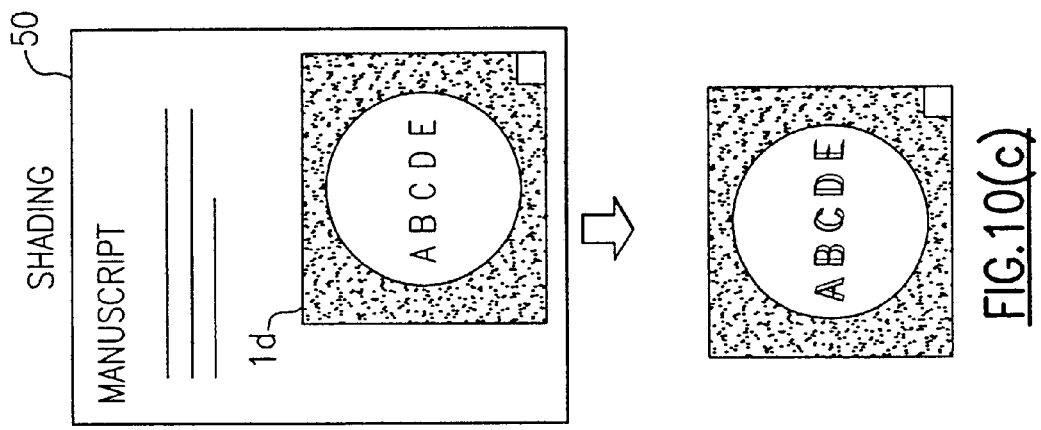
FIGS. 10(a)–10(c) are diagrams illustrating a plurality of ways of placing an information means, and corresponding processes.
Figure 10B:
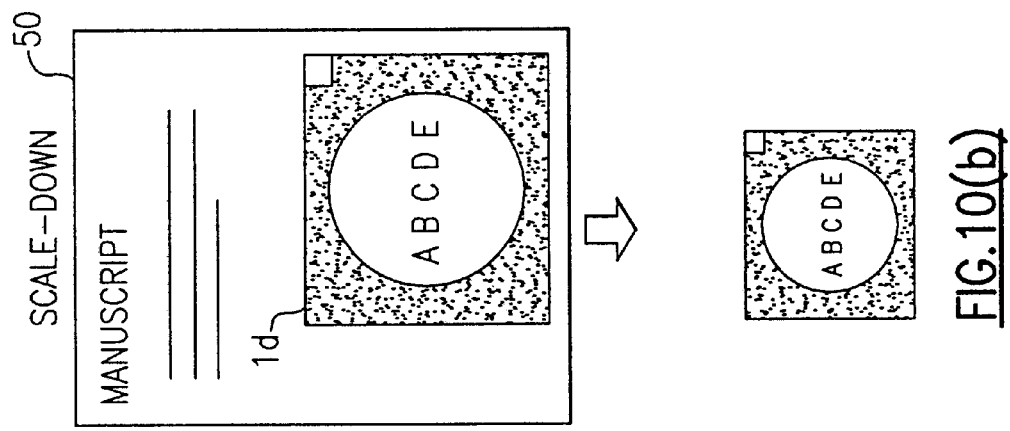
Figure 10A:
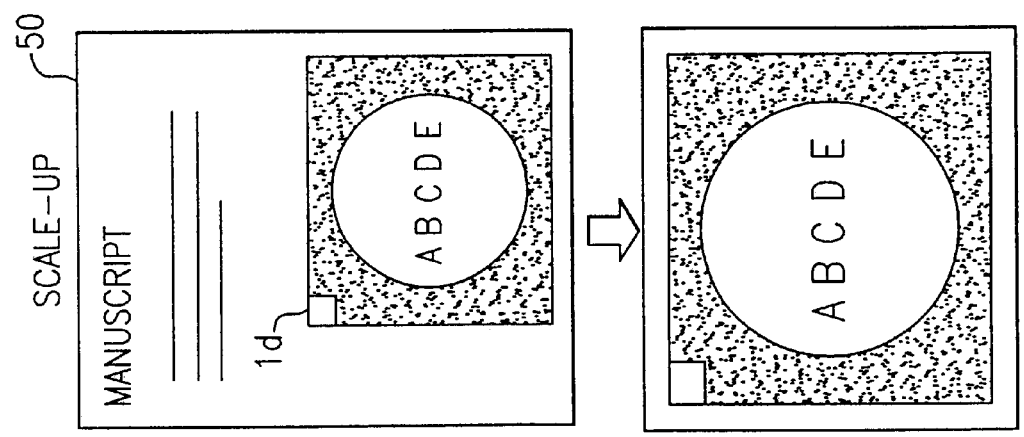

As shown in FIG. 10, the indication means 1d is placed on the manuscript 50 in a predetermined direction according to a process to be applied to the manuscript 50, and the manuscript 50 and the indication means 1d are put between the carrier sheets 51.

[STEP3c] Recognition of Indication Means Placing Way

Initially, the region of the indication means 1d is obtained by the indication means placing way recognition unit 6 in the same manner as described for [STEP3b] of the second embodiment, and a region including most white pixels is selected from four corners of the obtained rectangle region. Then, based on the position of the region, the placing way of the indication means 1d is recognized.

[STEP4c] Information Processing According to Placing Way

As shown in FIG. 10, according to the placing way (a), (b) or (c) recognized in [STEP3c], the manuscript is subjected to a predetermined process corresponding to the placing way, such as scale-up, scale-down, or shading.

As described above, according to the third embodiment of the invention, the placing way of the indication means 1d is recognized, and a predetermined process corresponding to the placing way is performed. Therefore, it is possible to subject the manuscript to a desired process by only changing the way of placing the indication means to select the process from a plurality of processes.

Embodiment 4

A description is now given of an information processing apparatus according to a fourth embodiment of the invention. In the first to third embodiments, a region indicated by the indication means on the manuscript is subjected to scale-up or the like to make this region easy to read. In this fourth embodiment, the distribution of concentration of the manuscript is detected, and blurred characters written by a pensile, a ball-point pen or the like are corrected to make them thicker and easier to read.

Figure 11:
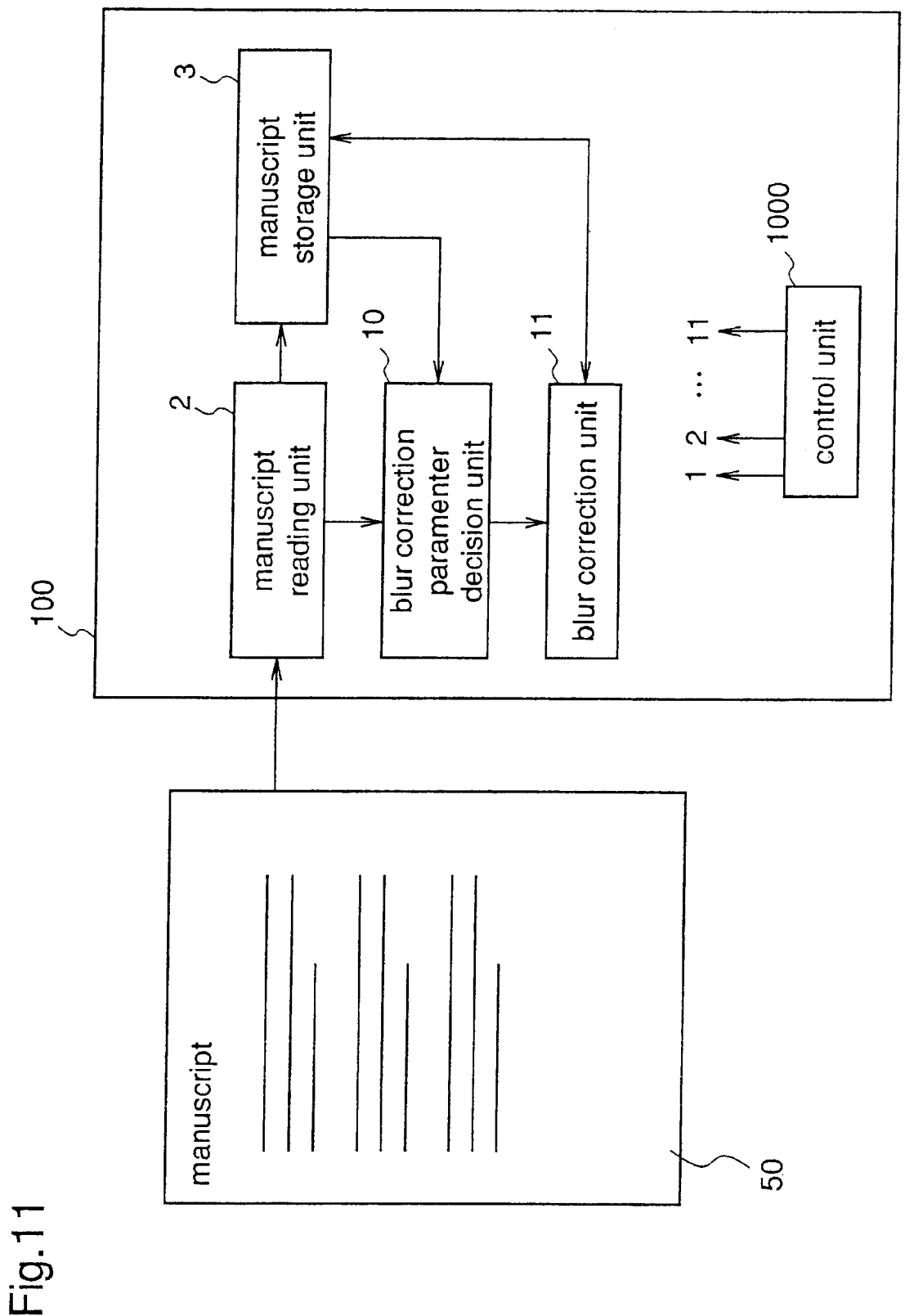
FIG. 11 is a block diagram illustrating a fourth embodiment of the process invention.

FIG. 11 is a block diagram illustrating the fourth embodiment of the invention, wherein the same reference numerals as those shown in FIG. 1 designate the same parts. Reference numeral 10 designates a manuscript correction parameter decision unit which detects the distribution of concentration of the manuscript and decides a correction parameter for a blurred part. Reference numeral 11 designates a blur correction unit which corrects the blurred part of the manuscript according to the correction parameter decided by the manuscript correction parameter decision unit 10.

Figure 12:
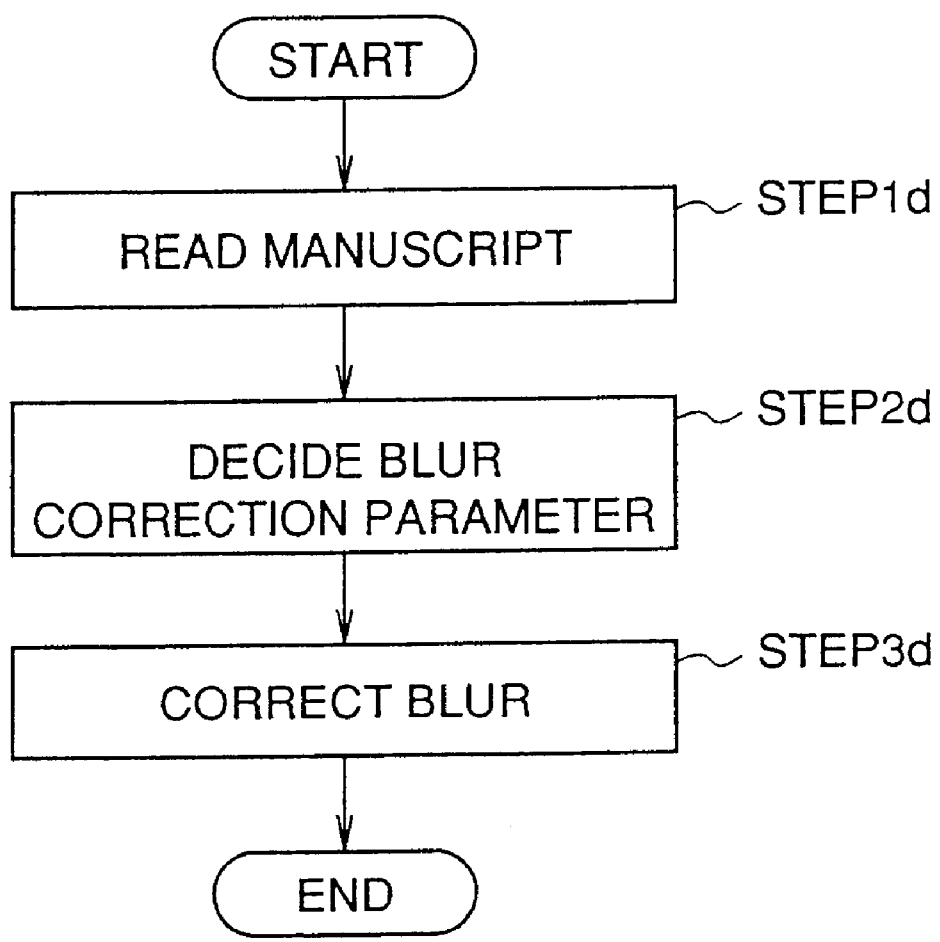
FIG. 12 is a flowchart showing the operation procedure of the fourth embodiment.
Figure 13:
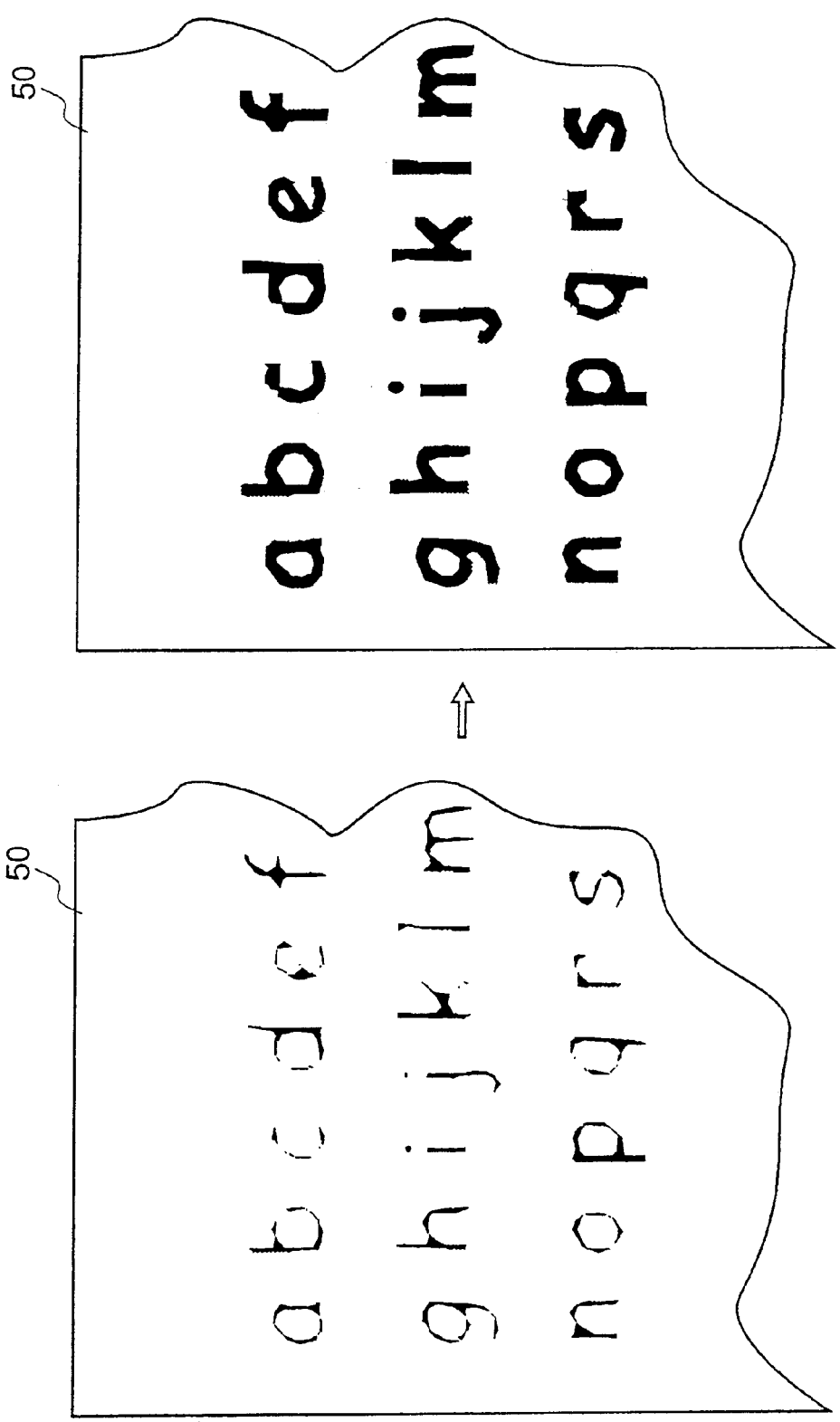
FIG. 13 is a diagram illustrating an example of blur correction.

Next, the operation of the information processing apparatus so constructed will be described with reference to a flowchart shown in FIG. 12. For simplification, a description is given of the case where a manuscript including thin and blurred characters as shown in FIG. 13(a) is transmitted after correcting the characters to thick and readable characters.

[STEP1d] Reading of Manuscript

A manuscript put between the carrier sheets is read by the manuscript reading unit 2 and stored in the manuscript storage unit 3. It is assumed that image data of the manuscript is represented as I(x,y). For example, the image data in a white (blank) portion of the manuscript is stored as I(x,y)=0, and the image data in a black portion where characters or the like are written is stored as I(x,y)=1. In an ordinary facsimile machine, $0 \leq x \leq 1728$ and $0 \leq y \leq 1100$.

[STEP2d] Decision of Blue Correction Parameter

Initially, a blurred portion of the manuscript is detected by the blur correction parameter decision unit 10. For example, the manuscript is divided into a plurality of sub-blocks each including pixels (I(x,y)) more than a predetermined number. This division is performed so that one character is divided into several sub-blocks and, for example, each sub-block may be a square block comprising 30 pixels×30 pixels. Then, the number of black pixels (I(x,y)=1) is counted in each sub-block. As a sub-block includes less black pixels, a portion of a character written in this block is thinner and more blurred. In other words, as a sub-block includes more black pixels, a portion of a character written in this block is thicker. Next, according to the number of black pixels included in the sub-region, a correction parameter to make the blurred portion thicker is decided. The correction parameter is a numerical value indicating how thick the blurred portion should be and, for example, it range from 1 to 5. The method of deciding the correction parameter may use the result of experimental correspondence between the range of the number of black pixels and the correction parameter. Alternatively, with respect to the black pixels, "many" and "few" may be represented by membership functions to decide the correction parameter by using fuzzy inference. When the number of the black pixels is larger than the predetermined value, correction is not carried out, thereby preventing a photograph or the like from being defaced to be indistinct.

[STEP3d] Blue Correction

In this step, using the blur correction unit 11, each sub-block is subjected to blur correction based on the correction parameter decided in [STEP2d]. For example, when the correction parameter is decided as 1, with respect to the image data in the (correction parameter+1) rows in the sub-block, each row is shifted to the left and the right by (correction parameter+1), and thus obtained rows and the original data (i.e., 3×(correction parameter+1) rows in total) are subjected to OR operation to obtain image data of new (correction parameter+1) rows.

According to the procedure mentioned above, as shown in FIG. 13(b), thin and blurred characters are corrected to thick and readable characters.

As described above, according to the fourth embodiment of the invention, characters on the manuscript are corrected to be thicker according to the degrees of thinness or blur of the characters, based on the distribution of concentration of the manuscript. Therefore, it is possible to send a readable manuscript even when it is written by using a pensile or a ball-point pen.

[Embodiment 5]

A description is now given of an information processing apparatus according to a fifth embodiment of the present invention. In the first to fourth embodiments, the manuscript is subjected to scale-up, shading, or blue correction to make it readable or attractive. In this fifth embodiment, a facsimile machine is provided with a confidential function of encrypting a portion indicated by an indication means so that only a person who knows the decryption method can read the portion.

The operation of an information processing apparatus of this fifth embodiment will be described with reference to FIG. 14. FIG. 14(a) shows a manuscript 50 in which a region is indicated by an indication means according to [STEP1a]~[STEP3a] of the first embodiment, and this manuscript 50 is stored in the manuscript storage unit 3. In this fifth embodiment, information to be encrypted is that a "Christmas party" will be held. FIG. 14(b) shows a received document. Initially, as shown in FIG. 14(a), the detected region is divided into a predetermined number of regions (a)~(d), along a predetermined direction, for example, the reading direction of the manuscript 50. Next, as shown in FIG. 14(b) (received document), the read information in the regions (a)~(d) are arranged at regular intervals along the predetermined direction. Then, information (a')~(d') which are symmetrical with the information read from the regions (a)~(d) in the predetermined direction, respectively, are added next to the respective regions (a)~(d). At this time, to facilitate decryption at the information receiving end, as shown in FIG. 14(b), a short-dashed line is inserted between the regions where the symmetrical information is arranged (e.g., (a) and (a')), while long-dashed lines are inserted between the different regions separated from each other. Decryption of the manuscript so processed is achieved by mountain-folding the paper at the short-dashed lines while valley-folding the paper at the long-dashed lines, and then abutting the mountain-folded portions on the valley-folded portions. Since the information cannot be read unless folding the paper, or cutting the paper and then combining the parts, it is seen at a glance as to whether someone other than an addresses has read the information or not. In this way, a confidential function is easily added to the manuscript.

As described above, in the fifth embodiment of the invention, the region indicated by the indication means is divided into a plurality of regions, and each region is subjected to the above-described mirror reflection process, whereby a confidential manuscript can be formed easily.

Figure 15B:
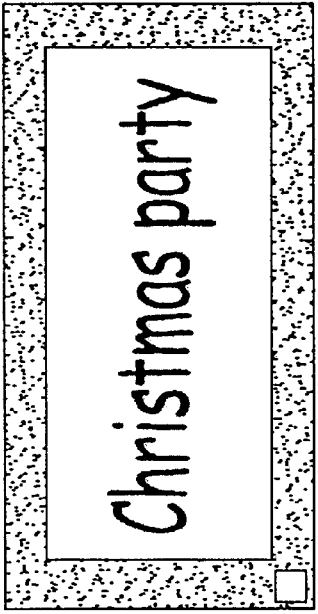
FIG. 15 is a diagram illustrating an example of encryption (random dot stereogram).
Figure 15A:
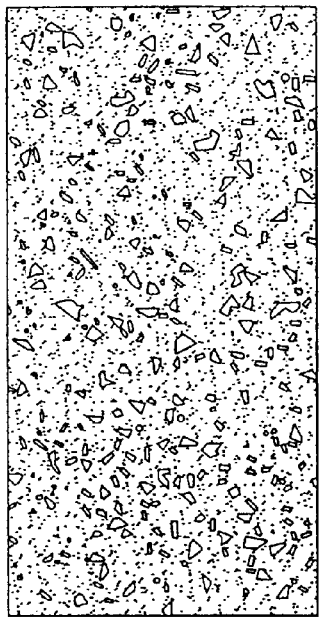

While in this fifth embodiment the division and mirror-reflection process is employed to encrypt the information in the region indicated by the indication means 1, other encryption methods may be employed. For example, as shown in FIG. 15, a manuscript 50 to be transmitted may be encrypted by random dot stereogram so that a random-dot-stereogrammed document 250 is received.

Furthermore, a facsimile machine at the receiving end may be provided with means for decryption. In this case, information read from the manuscript is encrypted so that it can be decrypted by only a facsimile machine having the function of decrypting the encryption.

Moreover, while in the first to fifth embodiments information processing apparatuses are described using facsimile machines, the information processing apparatuses according to these embodiments may be applied to other information equipment having other image reading means, such as a scanner or a copy machine, with the same effects as described for the respective embodiments. For example, when the information processing apparatus is applied to a scanner, only a portion indicated by the indication means can be enlarged to be read. When it is applied to a copy machine, only a region indicated by the indication means can be trimmed to be read, whereby only the indicated region can be printed out. In this way, information on the manuscript can be processed without complicated operation.

What is claimed is:

1. An information processing apparatus comprising:
    an indication means placed on a manuscript, said information means being a removable plate-shaped member which indicates at least one region of said manuscript;
    a reading unit for reading information on the manuscript;
    an indication means detection unit for detecting the indication means placed on the manuscript to thereby detect said at least one region indicated by the indication means on the manuscript, detecting an orientation of said indication means, and designating processing to be performed to contents of said at least one region based on said orientation of said indication means; and
    an information processing unit for performing said processing designated by said indication means detection unit to information obtained from said at least one region indicated by said indication means, amongst the information on the manuscript read by the region unit.

2. The information processing apparatus of claim 1 wherein:

said indication means detection unit detects a process indicated by the indication means; and said information processing unit performs the process indicated by the indication means to the information obtained from the region indicated by the indication means.

3. The information processing apparatus of claim 1 wherein said predetermined process is a process of encrypting the information in the region indicated by the indication means.

4. The information processing apparatus of claim 3 wherein said encryption process comprises the steps of dividing the information in the region indicated by the indication means into a plurality of sub-regions in a predetermined direction; arranging these sub-regions at regular intervals along the predetermined direction; and adding information, which is symmetrical with the information of each sub-region in the predetermined direction, to the information of each sub-region.

5. The information processing apparatus of claim 1, wherein said indication means detection unit detects said indication means solely from evaluation of said indication means.

6. An information processing apparatus comprising:

an indication means placed on a manuscript, said indication means being a removable plate-shaped member;

a reading unit reading information on the manuscript;

an indication means detection unit for detecting an orientation of said indication means, and designating processing to be performed to contents of an entirety of said manuscript based on said orientation of said indication means; and an information processing unit for performing said processing designated by said indication means detection unit to information obtained from said entirety of said manuscript indicated by said indication means, amongst the information of said manuscript read by said reading unit.

7. The information processing apparatus of claim 6, wherein said indication means detection unit detects said orientation of said indication means solely from evaluation of said indication means.

8. An information equipment comprising:

an indication means placed on a manuscript, said indication means being a removable plate-shaped member which indicates at least one region of said manuscript;

a reading unit for reading information on the manuscript;

an indication means detection unit for detecting the indication means placed on the manuscript to thereby detect said at least one region indicated by the indication means on the manuscript, detecting an orientation of said indication means, and designating processing to be performed to contents of said at least one region based on said orientation of said indication means; and an information processing unit for performing said processing designated by said indication means detection unit to information obtained from said at least one region indicated by said indication means, amongst the information on the manuscript read by the reading unit.

9. The information equipment recited in claim 8, wherein said indication means detection unit detects said indication means solely from evaluation of said indication means.

10. An information equipment comprising:

an indication means placed on a manuscript, said indication means being a removable plate-shaped member;

a reading unit for reading information on the manuscript;

an indication means detection unit for detecting an orientation of said indication means, and designating processing to be performed to contents of an entirety of said manuscript based on said orientation of said indication means; and an information processing unit for performing said processing designated by said indication means detection unit to information obtained from said entirely of said manuscript indicated by said indication means, amongst the information of said manuscript read by said reading unit.

11. The information equipment recited in claim 10, wherein said indication means detection unit detects said orientation of said indication means solely from evaluation of said indication means.

* * * * *

UNITED STATES PATENT AND TRADEMARK OFFICE
CERTIFICATE OF CORRECTION

PATENT NO. : 6,546,151 B1  
DATED : April 8, 2003  
INVENTOR(S) : Shoichi Araki et al.

It is certified that error appears in the above-identified patent and that said Letters Patent is hereby corrected as shown below:

<u>Title page,</u>  
Item [57], ABSTRACT,  
Line 13, please change "indicated" to -- indication --.

<u>Column 10,</u>  
Lines 55-56, please change "information" to -- indication --.

<u>Column 11,</u>  
Line 3, please change "region" to -- reading --.  
Line 32, after "unit" please add -- for --.

<u>Column 12,</u>  
Line 37, please change "entirely" to -- entirety --.

Signed and Sealed this

Ninth Day of September, 2003

JAMES E. ROGAN  
*Director of the United States Patent and Trademark Office*